United States Patent
Parikh et al.

(10) Patent No.: US 7,194,386 B1
(45) Date of Patent: Mar. 20, 2007

(54) AUTOMATED COLLECTION OF INFORMATION

(75) Inventors: Ashish Parikh, Issaquah, WA (US); David Brooks, Duvall, WA (US); Henry J. Lyons, Seattle, WA (US); Ram P. Papatla, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/252,528

(22) Filed: Oct. 17, 2005

(51) Int. Cl.
*G06F 15/00* (2006.01)

(52) U.S. Cl. .............. 702/188; 707/101; 707/102; 709/219; 709/224; 715/500.1

(58) Field of Classification Search .......... 702/182, 702/188; 705/1, 17; 707/100, 101, 102; 709/219, 224, 223, 226
See application file for complete search history.

(56) References Cited

U.S. PATENT DOCUMENTS

| | | | |
|---|---|---|---|
| 5,255,182 A | | 10/1993 | Adams et al. |
| 5,860,072 A | * | 1/1999 | Schofield ............... 707/101 |
| 6,078,953 A | | 6/2000 | Vaid et al. |
| 6,341,309 B1 | | 1/2002 | Vaid et al. |
| 6,751,655 B1 | * | 6/2004 | Deutsch et al. ........... 709/219 |
| 6,820,118 B1 | | 11/2004 | Leymann et al. |
| 6,871,233 B1 | | 3/2005 | Bearden et al. |
| 2003/0055948 A1 | | 3/2003 | Wang |
| 2003/0225549 A1 | | 12/2003 | Shay et al. |
| 2004/0010716 A1 | | 1/2004 | Childress et al. |
| 2005/0015712 A1 | * | 1/2005 | Plastina et al. .......... 715/500.1 |
| 2006/0190472 A1 | * | 8/2006 | Perry et al. ............. 707/102 |

FOREIGN PATENT DOCUMENTS

| | | |
|---|---|---|
| WO | WO 2004001555 | 12/2003 |
| WO | WO 2005046110 | 5/2005 |

OTHER PUBLICATIONS

"Microsoft TechNet; Service Management Functions; Executive Summary" from http://www.microsoft.com/technet/itsolutions/cits/mo/smf/smfsmc.mspx#EGAA printed Nov. 11, 2005.

"Management Services Overview; Value Add Management Solutions" from http://www.microsoft.com/ntserver/techresources/management/MgmtOver.asp printed Nov. 11, 2005.

"Service Quality Manager; Overview" from http://www.managementsoftware.hp.com/products/sqm/index.html printed Nov. 11, 2005.

* cited by examiner

*Primary Examiner*—John E. Barlow, Jr.
*Assistant Examiner*—John Le
(74) *Attorney, Agent, or Firm*—Wolf, Greenfield & Sacks, P.C.

(57) ABSTRACT

Computer-implemented methods and apparatus are provided for collecting information gathered by an instrumentation mechanism for transport to an information collection facility. In one embodiment, the information that is collected is defined by a configuration file. An application may examine the configuration file, execute one or more queries specified by the configuration file, and write the data which is collected to one or more data structures employed by a transport mechanism in transferring information to the information collection facility. The process of collecting the information may occur periodically, such as nightly. The configuration file may be periodically updated to reflect new information that is to be collected.

4 Claims, 5 Drawing Sheets

AUTOMATED COLLECTION OF INFORMATION

FIELD OF THE INVENTION

This invention relates to computers deployed in a client-server environment, and more particularly to the automated collection of information stored thereon.

BACKGROUND OF THE INVENTION

Various mechanisms are known for collecting and reporting information related to software quality and performance. For example, the Service Quality Metrics (SQM) tool produced by Microsoft Corporation of Redmond, Wash. provides a mechanism for collecting information on the execution of software programs and uploading that information to a central collection facility. The collection facility receives information from a plurality of computers, and aggregates the information for analysis and reporting. As a result of mechanisms such as SQM, software providers may analyze the performance of their products at an aggregate level, and improve their products over time.

SQM provides a mechanism whereby a user, such as a system programmer, may implement instrumentation that monitors the execution of a program. Typically, "instrumenting" a program involves implementing software routines which are called at program run time, and which record information related to the program's execution. Implementing these software routines usually requires that a programmer extend or modify the program source code, which is converted into binary form when the program is compiled. Instrumenting a program may provide any information related to the program's execution, ranging from a comprehensive view of its execution paths to critical data items employed in its processing. This information is usually written to one or more data structures. In the case of SQM, this information is periodically uploaded by a transport mechanism to the collection facility. Because information is aggregated at the collection facility, the data structure uploaded from each computer complies with a fixed format to facilitate efficient processing at the collection facility.

Instrumenting a program can be time-consuming and difficult. For example, as noted above, code must added to the program in its original source representation, which typically requires specialized programming knowledge. In addition, detailed analysis of the questions to be answered via the instrumentation must often be performed. In the case of SQM, this analysis may include determining how aggregated information at the collection facility may be used to answer these questions. This process can be time-consuming, regardless of a programmer's expertise. In addition, the process of modifying or extending source code to instrument a program, which may use complex techniques for storing and forwarding data, offers ample opportunity for errors to be introduced.

SUMMARY OF THE INVENTION

Applicants have appreciated that much of the information that a user may endeavor to collect by instrumenting a program for upload via SQM (e.g., registry information, performance counters, logs, etc.) is collected and stored by existing instrumentation mechanisms, such that the time and expense associated with re-instrumenting a program need not be incurred. For example, in some Microsoft software installations, the Windows Management Instrumentation (WMI) mechanism collects instrumentation data and stores it in one or more data structures which may be queried. Accordingly, one embodiment of the invention provides a technique for mapping existing instrumentation data (e.g. provided by a mechanism such as WMI, or other mechanisms or information sources) to a mechanism used for collecting and uploading information to a central facility (e.g., SQM). Using this technique, information collected and stored by existing instrumentation mechanisms may be accessed, without requiring re-instrumentation, and collected for upload.

In accordance with an exemplary embodiment of the invention, the instrumentation mechanism may be called, and/or the data structure(s) maintained by the instrumentation mechanism may be queried, at periodic intervals so that information on software quality and performance can be collected. The information which is collected may be defined, for example, by a configuration file. The information collected may then be mapped to specific entries in a data structure for upload to a collection facility. The information may include data relating to the performance of one or more computer programs and/or the characteristics of the computer(s) on which those programs execute. Information may be uploaded or otherwise transported to the collection facility on a periodic basis, such as nightly.

In an exemplary embodiment, information is collected only if the user of the computer (e.g., a system administrator) consents to the collection. Information received by the collection facility may be processed at an aggregate level, such that information is not identifiable as originating from specific individual computers. This and other information may be used to build reports on, for example, the installation of server roles (i.e., modules or components installed on individual computers which define the tasks or services which server applications executing on those computers perform on behalf of client applications), the correlation between server roles and characteristics of computers (e.g., ascertainable via automated techniques, such as queries) on which the respective server applications execute, and/or other information.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in the drawings.

DETAILED DESCRIPTION OF THE INVENTION

One embodiment of the invention comprises a process whereby information that is collected on a computer by an instrumentation mechanism (e.g., WMI or the like) may be accessed and prepared for upload via a transport mechanism (e.g., SQM or the like) to a central collection facility. In one embodiment of the present invention, an application program residing on the computer executes this process. The application may execute the process periodically (e.g., nightly). The process may comprise examining a configuration file that defines information that is to be collected. Based on the contents of the configuration file, the application may query one or more data structures used by the instrumentation mechanism to store data and/or call the instrumentation mechanism. Any information may be collected, as the invention is not limited in this respect. For example, in one embodiment, information relating to components installed and/or executing on the computer on which the process executes is collected.

Once information is collected, it may be prepared for transmission by the transport mechanism. In one example, it may be mapped to specific fields or entries within one or more data structures which the transport mechanism employs to transmit information to the collection facility. For example, a data string which is collected via the instrumentation mechanism may be mapped to a corresponding field within a file that is uploaded by the transport mechanism to the collection facility. The information may then be transmitted by the transport mechanism to the central collection on a periodic basis (e.g., nightly, upon the completion of the collection and preparation steps).

Figure 1:
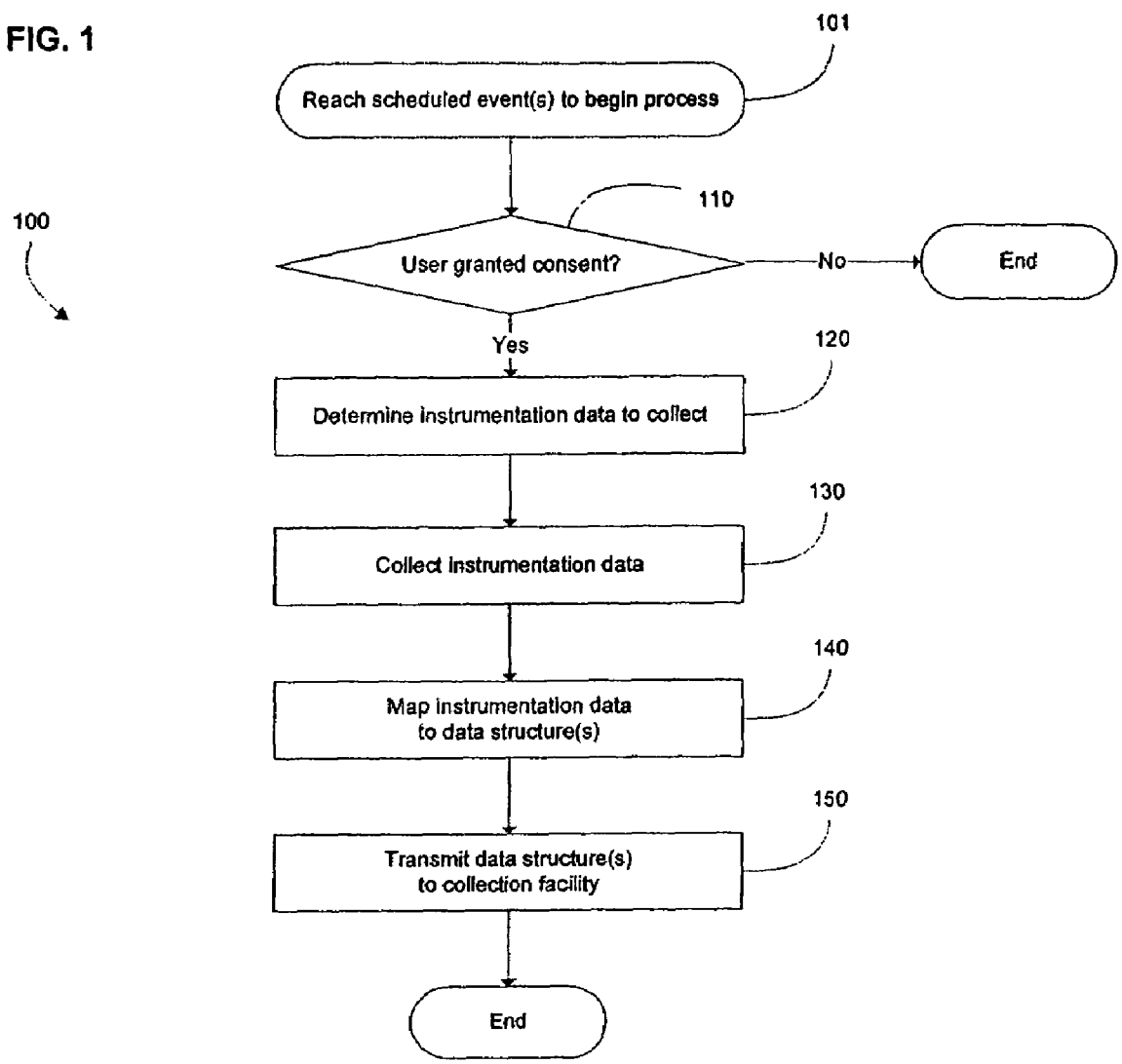
FIG. 1 is a flowchart depicting an exemplary technique for collecting instrumentation data in accordance with one embodiment of the invention.
Figure 2:
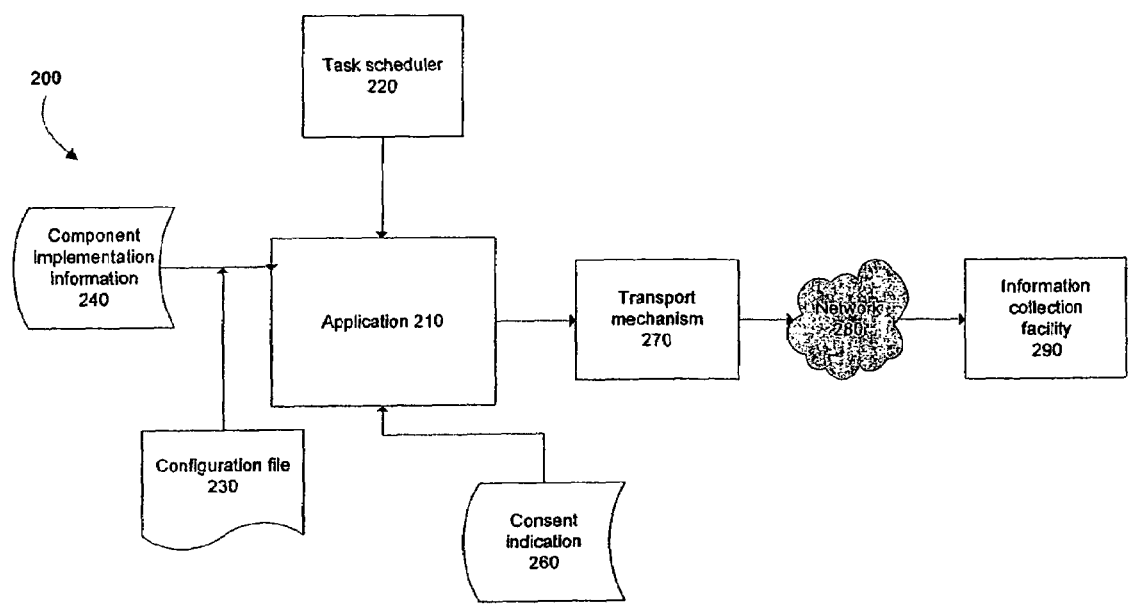
FIG. 2 is a block diagram depicting an exemplary system by means of which instrumentation information may be collected and/or transported, in accordance with one embodiment of the invention.

An exemplary process 100 for collecting information is shown in FIG. 1. Process 100 may be executed, for example, by system 200 shown in FIG. 2. More specifically, portions of process 100 may be executed by application 210. Other portions of process 100, wherein information that is collected is transmitted to a central collection facility, may be executed using a transport mechanism. As an example, SQM may be employed to transmit information to a collection facility.

Process 100 may begin with act 101. Specifically, as indicated by the dotted lines surrounding act 101, process 100 may begin upon the occurrence of a scheduled event. As an example, process 100 may be configured to begin when a specified time is reached. In one embodiment, task scheduler 220 (FIG. 2) may create a task (e.g., in a queue maintained by a server application) and set a time at which the task should begin. This time may, for example, be set such that process 100 kicks off when the processing load on the computer on which it executes is expected to be light. For example, process 100 may be set to begin at 1:00 a.m. local time at the location of the computer, or at another time when the computer is likely to be lightly used. In one embodiment, the time or event which defines the start of process 100 may be modified by a user (e.g., a system administrator). In addition, in one embodiment process 100 may be set to execute periodically, such as nightly.

Additionally, in one embodiment, process 100 is designed to execute in a manner which conserves processing and/or system resources. For example, process 100 may be configured to restart only once upon failing, so that processing resources are not unduly occupied with attempting to restart process 100 after failure multiple times. Process 100 may also be configured to detect when the computer on which it executes is running on batteries, and the battery level is "low" or "critical". If so, process 100 may not execute. A process may accommodate the needs of a particular system in any of numerous ways, as the invention is not limited in this respect.

Upon the completion of act 101, the process proceeds to act 110, wherein it is determined whether a user has granted consent to collect the information. For example, application 210 (FIG. 2) may examine consent indication 260, which may be provided in a data structure. Consent indication 260 may be defined, for example, by a user's response to a request to provide consent. For example, the user (e.g., a system administrator) may be prompted to provide consent to send the information when the server application is installed.

If it is determined that consent has not been given, then the process completes. If it is determined that consent has been given, then the process proceeds to act 120, wherein the instrumentation data that is to be collected is identified.

In one embodiment, act 120 is performed by application 210, which determines the information that is to be collected by examining configuration file 230. Configuration file 230 may include, for example, queries and/or other selection mechanisms and criteria which are executed against one or more data structures employed by an instrumentation mechanism to store information relating to the performance of one or more computer programs, and/or the characteristics of the computer on which those programs execute. Configuration file 230 may also specify the format of the information that is to be collected (e.g., whether it is stored in binary or alphanumeric form) and one or more transformations that are to be performed on the information once collected.

An exemplary configuration file 230 defining instrumentation data that is to be collected is shown below. This exemplary configuration file is provided in XML format. However, it should be appreciated that the invention is not limited in this respect, and that a configuration file in any suitable format may be used. The elements and attributes provided in this exemplary XML configuration file are described below.

```
<?xml version="1.0" encoding="UTF-8" ?>
<WMIConfig xmlns="http://tempuri.org/roleschema.xsd" version="1">
    <roleSection roleValue="0">
        <datapoints>
            <WMIDatapoint dataId="35" dataType="DWORD"
              query="SELECT * FROM Win32_ComputerSystem"
              propName="TotalPhysicalMemory" scale="1048576" />
            <WMIDatapoint dataId="31" dataType="DWORD"
              query="SELECT * FROM Win32_ComputerSystem"
              propName="NumberOfProcessors" scale="1" />
            <WMIDatapoint dataId="30" dataType="DWORD"
              query="SELECT * FROM Win32_Processor WHERE
                ProcessorType=3"
              propName="Family" />
            <WMIDatapoint dataId="113" dataType="DWORD"
              query="SELECT * FROM Win32_Processor WHERE
                ProcessorType=3"
              propName="MaxClockSpeed" />
        </datapoints>
        <streams>
            <WMIStream dataId="210" maxValues="10"
              query="SELECT * FROM Win32_DiskDrive">
                <WMIPositions>
                    <WMIStreamElement position="0" dataType="DWORD"
                      propName="Size" scale="1073741824" />
                    <WMIStreamElement position="1" dataType="String"
                      propName="InterfaceType" />
```

-continued

```
        </WMIPositions>
      </WMIStream>
    </streams>
  </roleSection>
  <roleSection roleValue="2">
    <datapoints>
      <WMIDatapoint dataId="35" dataType="DWORD"
        query="SELECT * FROM Win32_ComputerSystem"
        propName="TotalPhysicalMemory" scale="1048576" />
    </datapoints>
  </roleSection>
</WMIConfig>
```

Overall, the exemplary configuration file shown above is organized to specify a set of "data points" and "streams" which are to be collected for each of a series of server roles implemented on a computer. As described above, a server role is defined primarily by the implementation of a module or component of a server application which allows the server application to provide specific services or perform specific tasks on behalf of client applications. For each server role, one or more data points, each comprising a specific value retrieved from a data structure(s) employed by the instrumentation mechanism, and one or more streams, each comprising a sequence of values retrieved from the data structure(s), are specified. Of course, information that is common to all roles, and/or a subset of roles, may also be collected.

The exemplary file shown above includes an element defining a "role section" for each server role. In one embodiment of the invention, a role section in the configuration file is only examined if it is determined that the corresponding role is implemented in the server application. In this respect, embodiments of the present invention may be employed in conjunction with a system designed to determine the server roles that are implemented and/or in use on a particular computer, such as the system which is disclosed by commonly assigned U.S. patent application bearing Ser. No. 11/253,246 entitled "Collecting Information On Component Implementation And Use," filed on Oct. 17, 2005.

In the exemplary configuration file shown above, the "roleSection" element defines a server role for which data points and/or streams are to be collected. The "roleSection" element includes a "roleValue" attribute, which, in one embodiment, specifies a value that corresponds to a role identifier. This role identifier may, for example, be defined by the system described in the commonly assigned application referenced immediately above. The role identifier may be employed to provide a shorthand identifier for a role. Thus, the role identifier specified by a "roleValue" of "0" in the exemplary configuration file above may, for example, indicate a file server role, such that a module or component enabling a server application to perform as a file server is implemented on the considered computer. In one embodiment, a particular value for a "roleValue" (e.g., "9") may be reserved to specify that certain information specified within the "roleSection" should be collected unconditionally.

Within each role section, a "datapoints" element is provided, which includes one or more "WMIDatapoint" elements. Each "WMIDatapoint" element defines a datum which may be retrieved by querying or otherwise accessing a data structure employed by an instrumentation mechanism (e.g., WMI). Each "WMIDatapoint" element includes any or all of a collection of attributes which includes "dataID", "dataType", "query", "propName", and "scale" attributes, each of which provide information on how the datum may be retrieved from a data structure employed by the instrumentation mechanism or written to a data structure employed by a transport mechanism.

In the exemplary configuration file shown above, the "dataID" attribute provides an identifier for a data element in a data structure employed by the transport mechanism. The "dataType" attribute defines the format of the element in the data structure used by the transport mechanism. The "dataID" and "dataType" attributes are described in further detail with reference to act 140 below.

In the exemplary configuration file shown above, the "query" attribute defines an SQL query (e.g., as specified by the WMI Query Language, or WQL) that is executed against a data structure employed by the instrumentation mechanism. It should be appreciated, however, that any form of retrieval instruction, command or criteria may be provided, as the invention is not limited to a particular implementation.

In one embodiment, execution of the SQL query defined by the "query" attribute returns a collection of properties, each of which define a characteristic of the computer on which the server application executes. As such, the "propName" attribute identifies a specific property which is extracted from the query results. As an example, the "TotalPhysicalMemory" property may be extracted from the results of the SQL query "SELECT*FROM Win32_ComputerSystem".

The "scale" attribute may define a value for scaling the value for the property that is extracted. That is, the value of the selected property may be divided by the value defined by the "scale" attribute to produce a result that is to written to the data structure used by the transport mechanism. Using the above example to illustrate, if the value returned by extracting the "TotalPhysicalMemory" property is 256,000,000 (bytes), and the value defined by the "scale" attribute is 1,000,000, then a result of 256 may be written to the data structure used by the transport mechanism. Of course, any suitable scale value may be employed.

As described above, a role section may also include one or more data streams. In the exemplary XML configuration file shown above, a "stream" element may include one or more "WMIStream" elements, each specifying a data stream to be collected. Each "WMIStream" element includes one or more attributes, including "dataID", "query", and "maxValues" attributes. As with the "dataID" and "query" attributes described above with reference to data points, these attributes define an identifier for a particular stream within a data structure used by a transport mechanism, and a query which is executed against the data structure employed by the instrumentation mechanism, respectively.

The "maxValues" attribute defines the maximum length of the stream, such that a number of values up to this maximum value will be written to the data structure which is employed by the transport mechanism.

Each "WMIStream" defines one or more "WMIPositions" elements. Each "WMIPositions" element defines an ordered list of data elements which occupy positions within a particular stream. Specifically, each "WMIPositions" element specifies one or more "WMIStreamElement" elements, each of which defines a property that is to be extracted from the results generated by the query defined by the "query" attribute of the "WMIStream" element. Each "WMIStreamElement" includes attributes defining which property should be extracted and how the extracted property should be written to the data structure employed by the transport mechanism. Specifically, each "WMIStreamElement" element may include "position", "dataType", "propName", and "scale" attributes.

In the exemplary configuration file shown above, the "position" attribute defines a numbered position within a plurality of ordered, contiguous elements. In this exemplary file, these positions are numbered from 0 through 9. Of course, any number of positions may be provided, as the invention is not limited in this respect. Thus, a position of "0" specifies that the considered "WMIStreamElement" should be placed first in the ordered arrangement of positions.

The "dataType" attribute defines the format in which the data should be written to the data structure used by the transport mechanism. The "propName" attribute defines the property which is extracted from the query results. The "scale" attribute defines a value by which the extracted property should be divided before a value is written to the data structure used by the transport mechanism.

It should be appreciated that the configuration file shown and described above is merely exemplary, and that a configuration file may be defined in any suitable fashion. For example, a configuration file need not be defined using XML, and need not include the specific elements and attributes described above. It should also be appreciated that a configuration file may be provided for use in any suitable manner. For example, a configuration file may be transmitted to a computer on which process 100 executes by an external component (not shown), manually defined by a user, or defined in any other suitable fashion. The invention is not limited to a particular implementation.

It should also be appreciated that a configuration file may be provided in a structure which allows for information on a first computer to be collected by a second computer in communication with the first computer (e.g., via a network). For example, the configuration file may specify the namespace and/or machine name for the first computer, as will be readily understood by those skilled in the art. Upon determining from the configuration file that it is the first computer from which information should be collected, the second computer may also employ parameters specified by the configuration file to determine specific information that is to be collected.

Upon the completion of act 120, the process proceeds to act 130, wherein instrumentation data is collected. In an embodiment wherein the exemplary configuration file shown above is employed, instrumentation information may be collected by executing one or more queries defined by "WMIDatapoint" and/or "WMIStream" elements. In particular, the query or queries defined by these one or more elements may be executed, and a property may be selected from the query results based on the "propName" attribute defined by the respective element.

In addition, the ordered arrangement of information defined by a "WMIStream" element may be prepared. In particular, the query defined by the "query" attribute may be executed, and the property defined by the "propName" attribute may be extracted and placed in an ordered arrangement at a position defined by the "position" attribute.

Process 100 then proceeds to act 140, wherein the instrumentation data retrieved in act 130 is mapped to (i.e., written to specific positions within) the data structure(s) employed by the transport mechanism. In an embodiment in which the exemplary configuration file shown above is employed, application 210 may map the extracted property to the data structure(s) used by the transport mechanism according to the attributes defined in the configuration file. For example, for a specific data point, application 210 may map the extracted property to a particular position within a data structure based on the "dataID" attribute, in a format specified by the "dataType" attribute. If a "scale" attribute is provided, then application 210 may process the extracted property to divide it by the scaled value defined by the attribute. Similarly, for a specific data stream, application 210 may map the extracted properties to positions in an ordered arrangement of properties based on the "position" attribute, in a format specified by the "dataType" attribute. The value of the property may be scaled before it is written to the stream.

Upon the completion of act 140, the process proceeds to act 150. In act 150, the data structure(s) to which information was written in act 140 are transmitted to a central collection facility. For example, one or more files may be uploaded to a collection facility, where the information therein may be aggregated with information received from other sources for reporting and analysis. In one embodiment, the SQM transport mechanism may be invoked by application 210 to transmit the information. The SQM transport mechanism may be invoked, as an example, on a periodic basis, such as nightly.

Upon the completion of act 150, process 100 completes.

Figure 3:
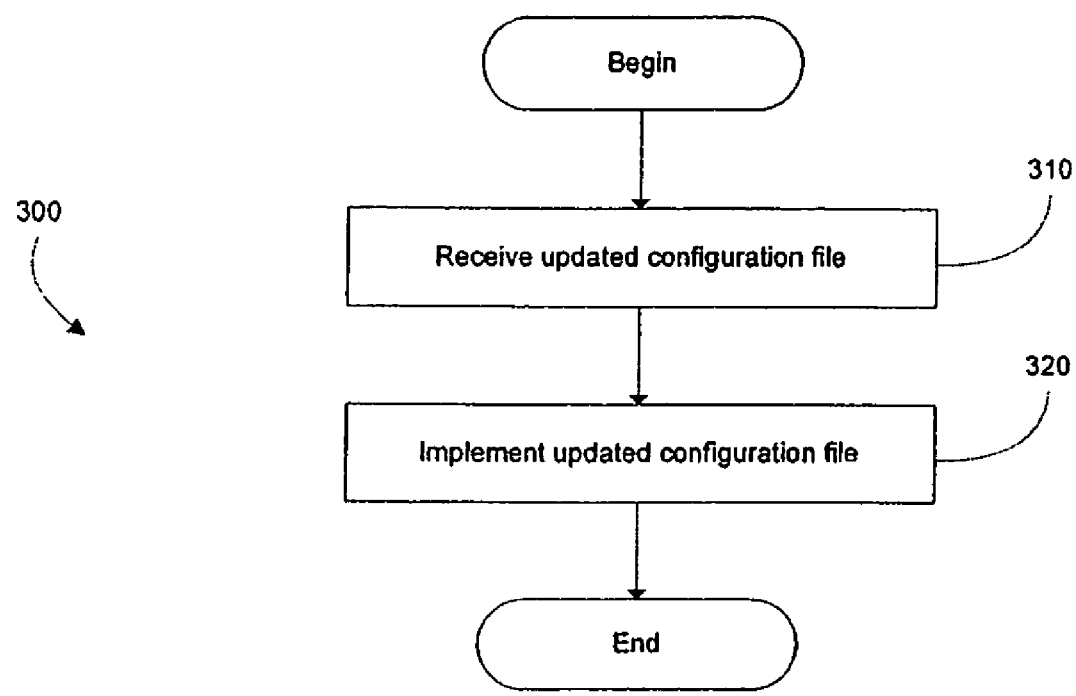
FIG. 3 is a flowchart depicting an exemplary technique for implementing an updated configuration file, in accordance with one embodiment of the invention.

Applicants anticipate that once information provided in the above-described process is analyzed, users may wish to extract different or additional information for analysis. FIG. 3 depicts a process whereby a configuration file, which defines the information that is to be collected, is updated on a particular computer.

Upon the start of process 300, an updated configuration file is received in act 310. As examples, a user (e.g., a system administrator) may download an updated configuration file to the computer (e.g., upon being prompted to do so), or manually update the existing configuration file on the computer, or an updated configuration file may be automatically downloaded to the computer use. Any suitable technique for receiving an updated configuration file may be employed, as the invention is not limited to a particular implementation.

Process 300 then proceeds to act 320, wherein the updated configuration file received in act 310 is implemented. For example, application 210 (FIG. 2) may be configured to access the updated configuration file.

Upon the completion of act 320, the process completes.

Figure 4:
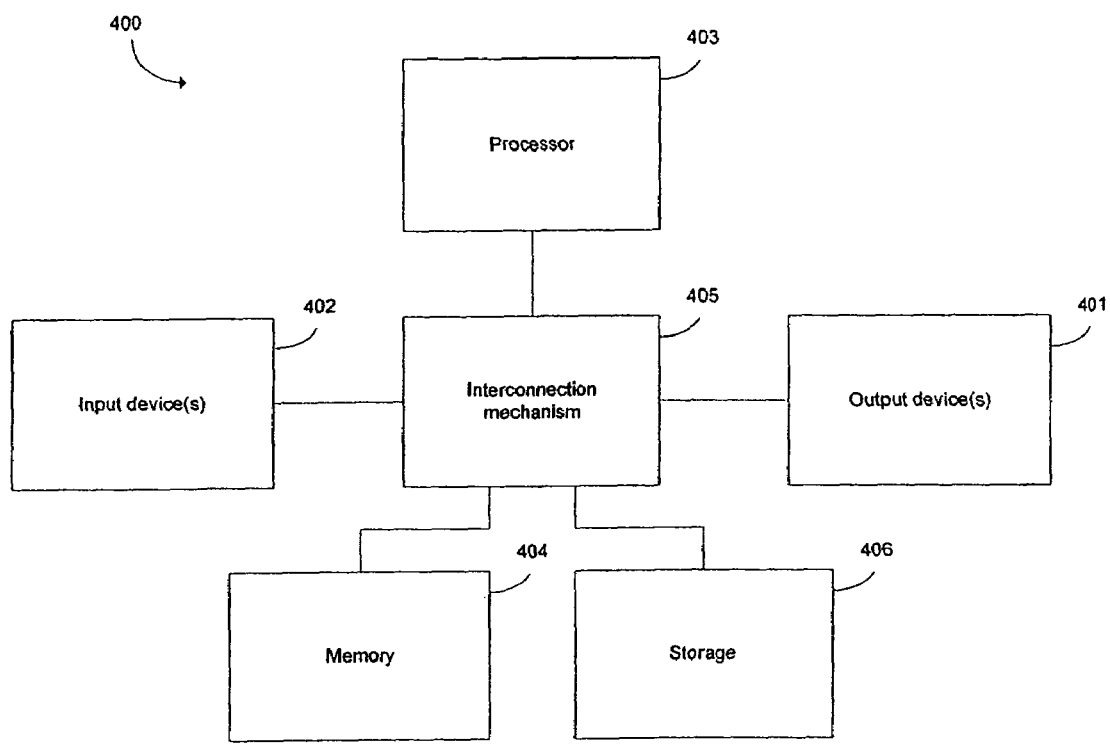
FIG. 4 is a block diagram depicting a computer on which aspects of embodiments of the invention may be implemented.

Various aspects of embodiments of the invention may be implemented on one or more computer systems, such as the exemplary system 400 shown in FIG. 4. Computer system 400 includes input device(s) 402, output device(s) 401, processor 403, memory system 404 and storage 406, all of which are coupled, directly or indirectly, via interconnection mechanism 405, which may comprise one or more buses or switches. The input device(s) 402 receive input from a user or machine (a human operator) and the output device(s) 401 display(s) or transmit(s) information to a user or a machine (e.g., a liquid crystal display).

The processor 403 executes a program called an operating system which controls the execution of other computer programs, and provides scheduling, input/output and other device control, accounting, compilation, storage assignment, data management, memory management, communication and data flow control. The processor 403 and operating system define the platform for which application programs and other computer programming languages are written.

The processor 403 may also execute one or more programs to implement various functions, such as those which embody aspects of the invention. These programs may be written in a computer programming such as a procedural language, object-oriented language, macro language, or combination thereof.

Figure 5:
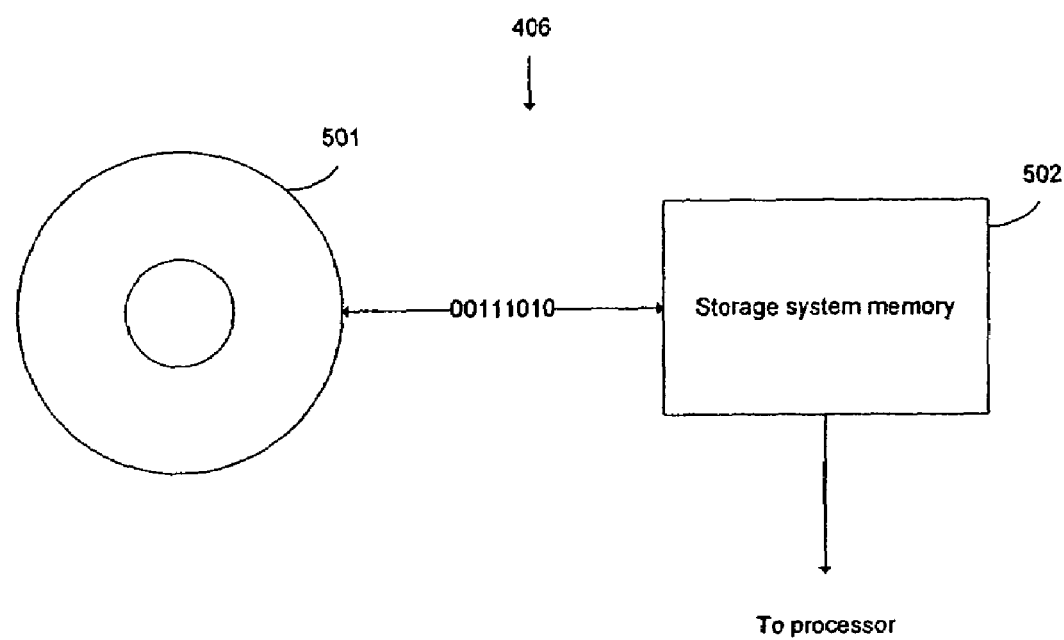
FIG. 5 is a block diagram depicting an exemplary memory on which aspects of embodiments of the invention may be implemented.

These programs may be stored in storage system 406. The storage system may hold information on a volatile or non-volatile medium, and may be fixed or removable. Storage system 406 is shown in greater detail in FIG. 5. It typically includes a computer-readable and -writable non-volatile recording medium 501, on which signals that define the program, or information to be used by the program, are stored. The medium may, for example, be a disk or flash memory. Typically, in operation, the processor 503 causes data to be read from the non-volatile recording medium 501 into a volatile memory 502 (e.g., a random access memory, or RAM) that allows for faster access to the information by processor 503 than does the medium 501. Memory 502 may be located in storage system 406, as shown in FIG. 4, or in memory system 504, as shown in FIG. 5. The processor 403 generally manipulates the data within the integrated circuit memory 404, 502, and then copies the data to the medium 501 after processing is completed. A variety of mechanisms are known for managing data movement between the medium 501 and the integrated circuit memory 404, 502, and the invention is not limited thereto. The invention is also not limited to a particular memory system 504 or storage system 406.

It should also be appreciated that the above-described embodiments of the invention may be implemented in any of numerous ways. For example, the above-discussed functionality may be implemented using software, hardware or a combination thereof. When implemented in software, the software code can be executed on any suitable processor or collection of processors, whether provided in a single computer or distributed among multiple computers. It should further be appreciated that any component or collection of components that perform the function as described herein may generically be considered as one or more controllers that control the above-described function. The one or more controllers may be implemented in numerous, such as with dedicated hardware, or by employing one or more processors which are programmed using microcode or software to perform the functions recited above. Where a controller stores or provides information for system operation, such information may be stored in a central repository, in a plurality of repositories, or a combination thereof.

Having thus described several aspects of the at least one embodiment of this invention, it is to be appreciated the various alterations, modifications, and improvements will be readily appreciated by those skilled in the art. Such alterations, modifications and improvements are intended to be part of this disclosure, and are intended to be within the spirit and scope of the invention. Accordingly, the foregoing description and drawings are by way of example only.

What is claimed is:

1. In a system comprising a computer in networked communication with an information collection facility, a transport mechanism implemented on the computer which is operable to transmit first information collected from the computer to the information collection facility upon the instrumentation of at least one program on the computer, and an instrumentation mechanism implemented on the computer which collects second information on the computer, wherein the transport mechanism transmits the first information using a first data structure which has a first format, and wherein the instrumentation mechanism stores the second information in a second data structure having a second format which does not comply with the first format, a method comprising steps of:
   (A) determining a portion of the second information to collect from the second data structure;
   (B) collecting the portion of the second information; and
   (C) writing a representation of the portion of the second information to the first data structure, so that the representation of the portion of the second information complies with the first format, wherein the step (A) further comprises examining a configuration file to determine the portion of the second information to collect, the step (B) further comprises collecting the portion of the second information by executing at least one query defined by the configuration file against the second data structure, and the step (C) further comprises writing the representation of the portion of the second information to the first data structure according to a specification defined in the configuration file.

2. The method of claim 1, wherein the steps (A), (B), and (C) are performed on a recurring periodic basis, and wherein, after a first periodic performance and before a second periodic performance, the method further comprises steps of:
   (E) receiving an updated configuration file; and
   (F) implementing the updated configuration file, so that the steps (A), (B) and (C) in the second periodic performance employ the updated configuration file.

3. At least one computer-readable medium having instructions recorded thereon, which instructions, when executed in a system comprising a computer in networked communication with an information collection facility, a transport mechanism implemented on the computer which is operable to transmit first information collected from the computer to the information collection facility upon the instrumentation of at least one program on the computer, and an instrumentation mechanism implemented on the computer which collects second information on the computer, wherein the transport mechanism transmits the first information using a first data structure which has a first format, and wherein the instrumentation mechanism stores the second information in a second data structure having a second format which does not comply with the first format, perform a method comprising steps of:
   (A) determining a portion of the second information to collect from the second data structure;
   (B) collecting the portion of the second information;
   (C) writing a representation of the portion of the second information to the first data structure, so that the representation of the portion of the second information complies with the first format, wherein the step (A) further comprises examining a configuration file to determine the portion of the second information to collect, the step (B) further comprises collecting the portion of the second information by executing at least one query defined by the configuration file against the second data structure, and the step (C) further comprises writing the representation of the portion of the second information to the first data structure according to a specification defined in the configuration file.

4. The at least one computer-readable medium of claim 3, wherein the steps (A), (B), and (C) are performed on a recurring periodic basis, and wherein, after a first periodic performance and before a second periodic performance, the method further comprises steps of:
   (E) receiving an updated configuration file; and
   (F) implementing the updated configuration file, so that the steps (A), (B) and (C) in the second periodic performance employ the updated configuration file.

* * * * *